Oct. 16, 1945.  E. C. WEHLE  2,387,220
CONVEYER
Filed Dec. 7, 1944  2 Sheets-Sheet 2

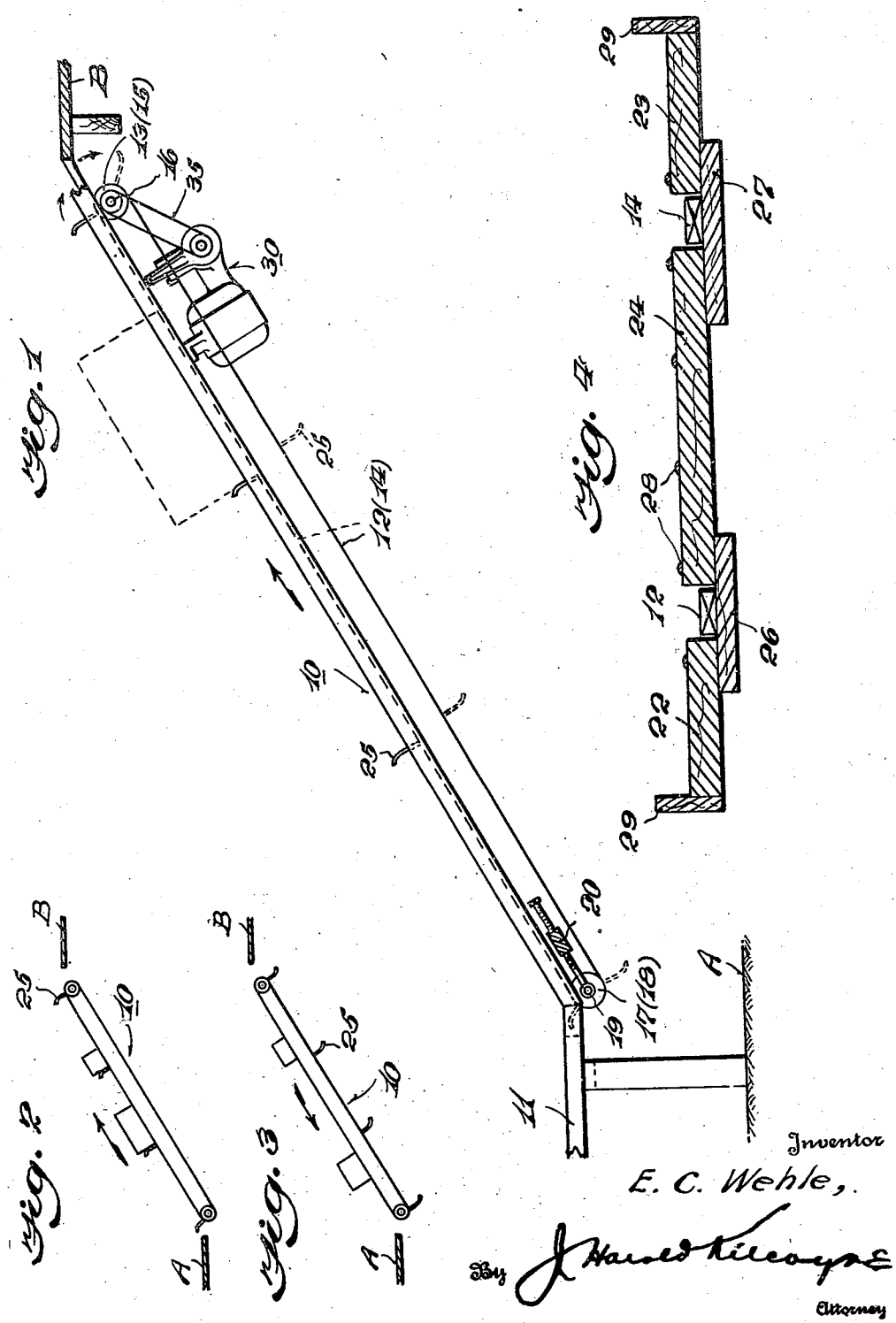

Inventor
E. C. Wehle,
Attorney

Patented Oct. 16, 1945

2,387,220

UNITED STATES PATENT OFFICE 2,387,220

CONVEYER

Edwin C. Wehle, Binghamton, N. Y.

Application December 7, 1944, Serial No. 566,986

7 Claims. (Cl. 198—173)

This invention relates to improvements in conveyers and in its more specific aspects to a combined power conveyer and chute capable of selective operation either as a power conveyer of the escalator type for conveying merchandise from a lower to a higher level floor or work station, or as a chute or slide for effecting descent of the merchandise from the higher to the lower level floor or work station by gravity.

A principal object of the invention is the provision of a self-contained conveyer and chute unit of inexpensive, yet rugged and dependable construction for facilitating the movement of freight, cartons and like goods hereinafter referred to as merchandise, between different floor levels or work stations of a store, warehouse, factory and like industrial or commercial establishments.

Among the more specific objects of the invention may be noted the provision of a combined conveyer and chute for merchandise which may be fabricated complete at the factory and shipped and installed as a unit; the provision of a combined power conveyer and chute as aforesaid whose construction permits of installation by a carpenter in a relatively short and simple operation; the provision of a combined merchandise conveyer and chute which is characterized by low initial cost as well as low cost of operation; and the provision of a selectively operable power conveyer and chute in which conversion from power to chute operation and vice versa can be simply and quickly effected.

Other objects will be in part obvious and in part hereinafter pointed out in connection with the following analysis of the invention wherein is described and illustrated one simple form of apparatus according to the invention.

In the drawings:

Fig. 1 is a side elevation illustrating a typical installation of the self-contained conveyer and chute unit according to the invention.

Figs. 2 and 3 are diagrammatic views illustrating power conveyer and chute operation, respectively, of the unit shown in Fig. 1.

Fig. 4 is a transverse section taken through the slide illustrating constructional details and showing the slide cleared for chute operation.

Fig. 5 is an enlarged view of the drive or head end of the unit; and

Fig. 6 is a section taken along line 6—6 of Fig. 5 showing the power unit in end view.

In the drawings, wherein like reference characters designate like parts throughout the several views, Fig. 1 shows a typical installation of a power conveyer and chute unit 10 according to the invention, in which the unit is mounted at a suitable inclination to extend between a work bench 11 on a lower floor A and an upper floor B, the upper end of the unit operating through a hole cut or otherwise provided in the upper floor. Hence, the positioning of the unit is such that it may function as a power conveyer to raise merchandise collecting on the bench 11 to the level of the floor B, and alternatively to effect gravity descent of the merchandise from floor B to the level of bench 11 or floor A. It is of course to be understood that the illustrated mounting of the conveyer chute unit is suggestive only, as the lower end of the unit may connect directly with the lower floor A or an associated conveyer thereon, and the upper end of the unit may be secured to a work bench corresponding to the work bench 11 disposed on floor B, to a gravity slide, or may be coupled to conveyers arranged at the upper floor level.

The unit as shown incorporates spaced endless drag chains 12, 14 (Figs. 4 and 6) of conventional conveyer chain construction, which are driven by sprockets 13, 15 (Figs. 5 and 6) fast on a transverse head shaft 16 mounted at the upper end of the unit. Due to the drive of both sprockets from a single shaft, it will be obvious that the conveyer chains are driven in unison. At the take-up end of the unit, the lower ends of the chains travel around idler sprockets 17, 18 fast on a tail shaft 19. Take-up means 20 of any approved type may be associated with the tail shaft 19 for the purpose of taking up chain slack.

As seen in Figs. 4 and 6, the conveyer chains travel in slots or grooves provided between outer and intermediate slide plates or planks 22, 23, 24, which are secured together to form a merchandise slide or chute, the width of the slots being such as to permit free movement of the chains, as well as of pusher arms 25 carried thereby. While the pusher arms 25 may take various forms as known in the art, it is preferred that the pusher arms be curved rearwardly to their direction of travel, whereby during power operation they maintain longer contact with the merchandise being conveyed as the arms travel around the head sprockets 13, 15.

The slide grooves are bottomed by chain supporting plates 26, 27 which bridge the slide plates as shown in Figs. 4 and 6, and to which the slide plates are secured by any suitable means such as rails or connecting straps (not shown). As seen also in Figure 2, the depth of the grooves is greater than the thickness of the chains so that the upper operating line of the chains is well below the top face of the slide, with the result that the chains proper offer no obstruction to the movement of merchandise along the slide.

The slide and chain supporting plates are preferably fabricated from wood selected for hardness and the upper faces of the plates may be specially treated to reduce friction of the merchandise traveling thereon and, in the case of the chain supporting plates, to permit free travel of the chains therealong. Or the slide plates may be provided along their length with metallic slide rails 28 (Fig. 4) on which the merchandise may ride in its ascending or descending travel. As seen in Fig. 4, side rails 29 are secured along the longitudinal side edges of the slide to confine the merchandise moving along the same in its proper course of travel.

The conveyer chains during power operation are driven by a power unit 30 hung from the slide, and preferably from the upper end thereof as generally shown in Fig. 1. As shown, the power unit comprises a gear-head motor unit incorporating a motor 31 and a built-in speed reduction gearing 32, the latter driving an angled shaft 33 on which is mounted a live sprocket 34. Drive is transmitted from sprocket 34 to the head shaft 16 by a driving chain 35, preferably of the roller type, which travels over a driven sprocket 36 fast on the head shaft. While a single drive chain is illustrated, it will be understood that drive from the angled shaft 33 to the head shaft 16 may be transmitted by twin chains, each corresponding to the single driving chain 35 shown. Other appropriate chain driving mechanisms may of course be substituted to meet particular installation requirements.

Referring to Fig. 5, the power unit 30 is secured to the slide by suitable hang brackets 36, 37 which are bolted to the spaced chain supporting plates 26, 27, as shown, the arrangement being such that the slide plates cover the connecting bolts, and hence the latter are well below the upper face of the slide proper. The head shaft 16 turns in suitable bearings 38 with which may be associated clearance blocks 39 to properly space the shaft below the upper face of the slide, the bearing and clearance blocks being thus mounted from below the slide and offering no obstruction to the movement of merchandise across the upper face thereof. Although not specifically shown, it will be understood that the idler shaft 19 is secured at the lower end of the slide in bearings similar to the head shaft bearings and is thus also disposed well below the upper face thereof of the slide proper.

From the apparatus so far described, it will be observed that a self-contained and unitary construction is provided in which the longitudinally extending slide plates 22, 23, 24 are secured together in unitary manner by the chain supporting plates 26, 27, with the conveyer chains and drive unit for powering the latter being bodily carried by the slide. Hence, the unit may be prefabricated complete at the factory and shipped and installed as a unit.

According to a further important feature of the invention, the pusher arms 25 are localized in a length of the chain such that, with the power unit inoperative, the chain can be shifted manually to a position in which the pusher arms are in an inoperative or out of the way position beneath the chute, i. e. along the reverse run of the chain. Such positioning of the pusher arms contemplates that they are secured at intervals along a run or stretch of the chain of length that does not exceed substantially more than one-half the entire length thereof. Thus, a length of chain approximating one-half the chain length is devoid of pusher arms and when such length of chain is moved into position over the slide, the latter may then function as an unobstructed chute on which merchandise may be lowered by gravity.

The aforesaid arrangement of pusher arms will be understood from a consideration of the diagrammatic views, Figs. 2 and 3. Fig. 2 represents power operation of the unit, with the pusher lugs of the ascending chain run functioning to propel merchandise such as cartons in an ascending path up the slide. In Fig. 3 representing the power-off operation, all pusher lugs are disposed beneath the slide, and the latter may now function as a chute for the gravity descent of the merchandise.

To install the combined power conveyer and chute according to the invention, it is necessary only that a hole or opening be cut through the upper floor B of width suitable to receive the upper end of the slide and of length to provide the necessary clearance for the merchandise being handled. Thereupon, the upper and lower ends of the slide may be appropriately cut and angled for nailing, for example, directly to the main and/or sub-flooring of the upper level floor B and to the work bench 11 at the lower level (or directly to the lower level floor A). In fitting the upper edge of the slide to the upper floor, where connection is made directly thereto, care should of course be taken to leave sufficient length of the slide as to provide turning clearance of the pusher arm 25. It will be observed that such installation is extremely simple and may be effected by a carpenter in a relatively short time.

Alternatively, the unit may be secured to the upper level floor B by hang brackets (not shown), and with its lower end resting freely on the lower floor A or work bench 11. This latter type of installation permits the unit to be coupled and uncoupled, and moved from place to place, as may be required.

The unit as aforesaid is supplied with conventional controls which may consist of a main motor switch and also with two station controls for operating the unit as a power conveyer from either floor. However, as such control means are conventional in conveyer operation and as they form no part of the present invention, no further description is believed to be necessary.

The self-contained character of a combined conveyer and chute unit as described will be self-evident. Its construction is such that it can be prefabricated complete at the factory and shipped and installed as a unit with a minimum of time and cost. By the simple procedure of putting the power unit in operation, the apparatus functions as a power conveyer for merchandise, the pusher arms 25 engaging the merchandise and moving the same upwardly over the surface of the slide to the second floor point of discharge. By the equally simple procedure of cutting out the power unit and moving the chain so that its pusher arms assume an out-of-the-way position beneath the slide, the latter may now function as a chute for the gravity descent of the merchandise from the higher to the lower floor or work station levels. Accordingly, the conveyer and chute unit as described possesses a functional flexibility not found in prior constructions and it is further characterized by low initial cost as well as of low cost operation, plus a simplicity in converting the unit from conveyer chute operation and vice versa.

As many changes can be made in carrying out the above construction without departing from the scope of the invention, it is intended that all matter contained in the above description or shown in the accompanying drawings shall be interpreted as illustrative and not in a limiting sense.

I claim:

1. In a combined power conveyer and chute, in combination, an inclined slide, an endless conveyer operatively related thereto and having pusher arms for propelling merchandise up the slide, power means for said conveyer, the disposition of the pusher arms along the length of the conveyer being such that said arms may be shifted to an out-of-the-way position beneath the slide as required to clear the latter whereby, with the power means inoperative and the slide cleared of pusher arms, the slide is effective as a gravity chute.

2. In a combined power conveyer and chute, in combination, an inclined slide, an endless conveyer operatively related thereto and having pusher arms for propelling merchandise up the slide, power means for said conveyer, said pusher arms being disposed along a predetermined length only of a conveyer which is such as to render the slide effective as a chute for the gravity descent of merchandise.

3. In a combined power conveyer and chute, in combination, an inclined slide, an endless conveyer operatively related thereto and having pusher arms for propelling merchandise up the slide, power means for said conveyer, said pusher arms being localized in substantially half the length of the conveyer whereby, with the power means inoperative, the conveyer may be shifted to bring the pusher arms beneath the slide so as to render the latter effective as a gravity chute.

4. In a combined power conveyer and chute, in combination, a slide adapted to be mounted in inclined position between floors, work stations and the like, the slide having a longitudinal groove opening through its upper face, an endless drag chain having its ascending run disposed in said groove and its return run extending along the under side of the slide, pusher arms carried by said chain, and a power unit supported from beneath the slide for driving the chain, the pusher arms being disposed along a length of the chain such that they can be moved to an out-of-the-way position beneath the slide, whereby the slide may function as a chute.

5. In a combined power conveyer and chute, in combination, a slide adapted to be mounted in inclined position between floors, work stations and the like, the slide having a longitudinal groove opening through its upper face, an endless drag chain having its ascending run disposed in said groove and its return run extending along the under side of the slide, pusher arms carried by said chain, a power unit supported from beneath the slide for driving the chain, the pusher arms being localized in substantially half the length of the entire chain, whereby the chain may be moved to a position in which the pusher arms assume an out-of-the-way position beneath the slide, whereupon the latter may function as a gravity chute.

6. In a combined power conveyer and chute, in combination, a slide comprising longitudinal slide plates spaced laterally from each other to provide longitudinal grooves and chain supporting plates extending between slide plates and forming groove bottoms, a conveyer drag chain comprising spaced endless strands adapted to be driven in unison and having ascending runs disposed in said grooves below the top face of the slide planes and return runs extending along the under side of the slide, and a power unit for driving said strands mounted from beneath the slide, the chain strands each having pusher arms for propelling merchandise up the slide, said pusher arms being disposed along a length of the strands such that, when the power unit is inoperative, they may be moved to an out-of-the-way position beneath the slide, whereby the latter may function as a chute for the gravity descend of merchandise.

7. In a combined power conveyer and chute, in combination, a slide comprising longitudinal slide plates spaced laterally from each other to provide longitudinal grooves and chain supporting plates extending between slide plates and forming groove bottoms, a conveyer drag chain comprising spaced endless strands adapted to be driven in unison and having ascending runs disposed in said grooves below the top face of the slide plates and return runs extending along the under side of the slide, and a power unit adapted to drive said chain strands mounted from beneath the slide, the chain strands each having pusher arms for propelling merchandise up the slide, said pusher arms being localized along substantially half the length of the chain strands, whereby with the power unit inoperative, the chain may be moved to bring the arms into an out-of-the-way position beneath the slide, whereupon the latter may function as a chute.

EDWIN C. WEHLE.